F. FREDEEN.
PONTOON BRIDGE AND OTHER ARMY EQUIPMENT COMBINED.
APPLICATION FILED NOV. 5, 1917.
1,279,097.
Patented Sept. 17, 1918.
3 SHEETS—SHEET 1.
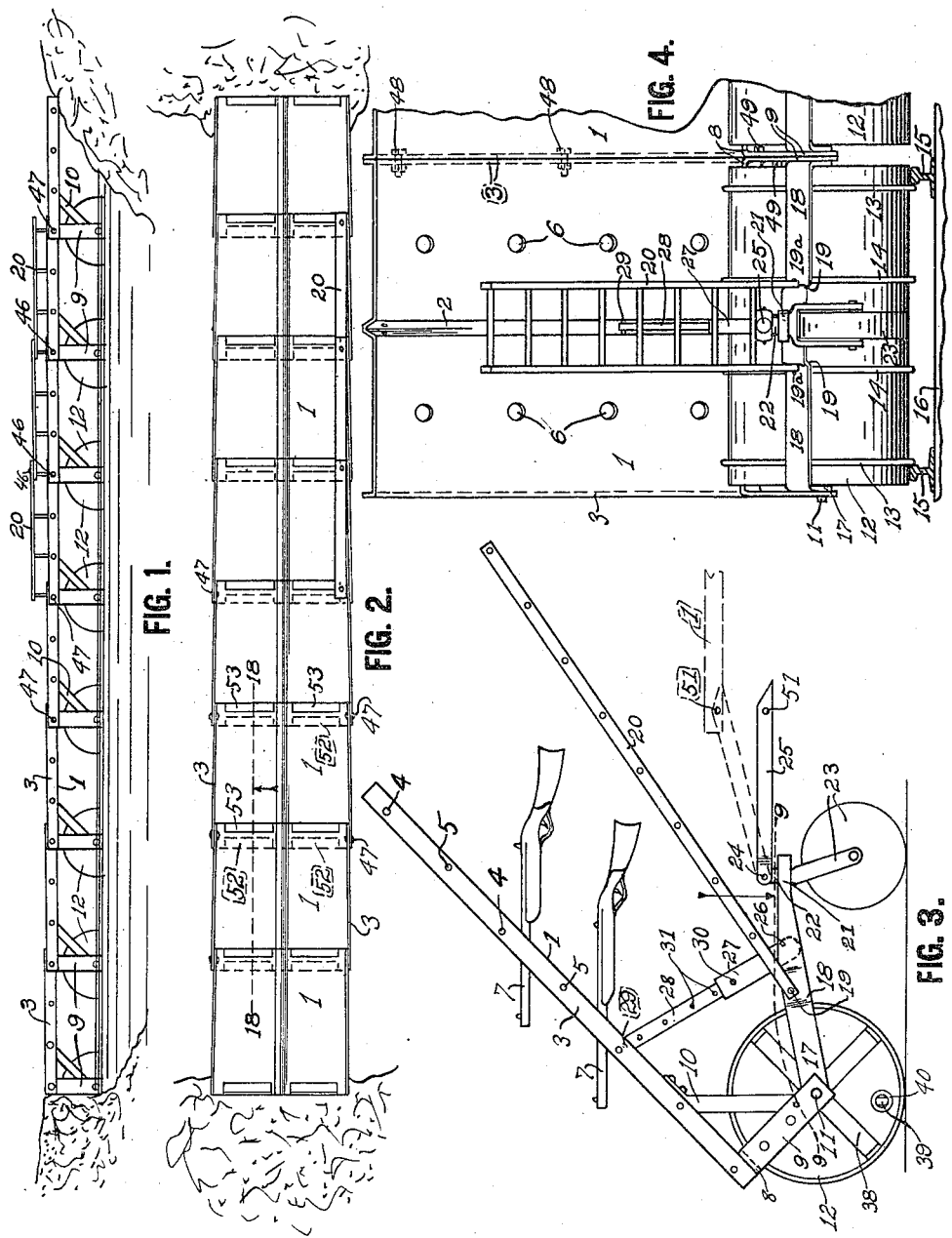
INVENTOR.
F. FREDEEN
BY HIS ATTORNEY:
A. M. Carlsen.

F. FREDEEN.
PONTOON BRIDGE AND OTHER ARMY EQUIPMENT COMBINED.
APPLICATION FILED NOV. 5, 1917.

1,279,097.

Patented Sept. 17, 1918.
3 SHEETS—SHEET 2.

INVENTOR.
F. FREDEEN
BY HIS ATTORNEY:
A. M. Carlsen.

F. FREDEEN.
PONTOON BRIDGE AND OTHER ARMY EQUIPMENT COMBINED.
APPLICATION FILED NOV. 5, 1917.

1,279,097.

Patented Sept. 17, 1918.
3 SHEETS—SHEET 3.

INVENTOR:
F. FREDEEN,
BY HIS ATTORNEY:
A. M. Carlsen.

UNITED STATES PATENT OFFICE.

FRANK FREDEEN, OF TAYLORS FALLS, MINNESOTA.

PONTOON-BRIDGE AND OTHER ARMY EQUIPMENT COMBINED.

1,279,097.　　　　　　　　Specification of Letters Patent.　　Patented Sept. 17, 1918.

Application filed November 5, 1917. Serial No. 200,227.

*To all whom it may concern:*

Be it known that I, FRANK FREDEEN, a citizen of the United States, residing at Taylors Falls, in the county of Chisago and State of Minnesota, have invented a new and useful Pontoon-Bridge and other Army Equipment Combined, of which the following is a specification.

My invention relates to war appliances and the main object is to provide a device that is convertible into various forms and thereby applicable for various purposes in the movement and operation of an army, as will hereinafter be fully described.

Figure 5:
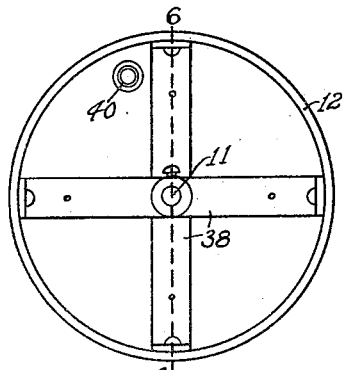
Figure 6:
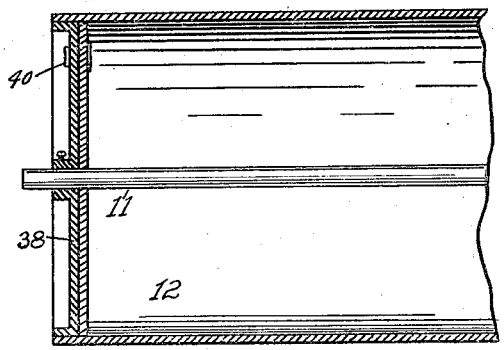
Figures 7, 8:
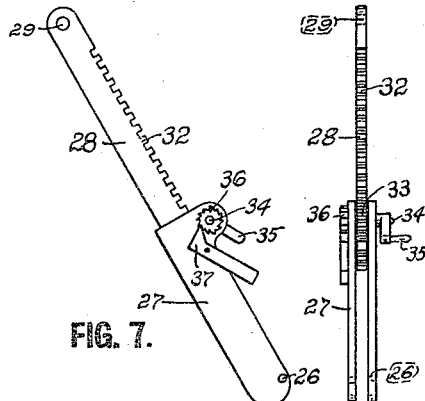
Figure 9:
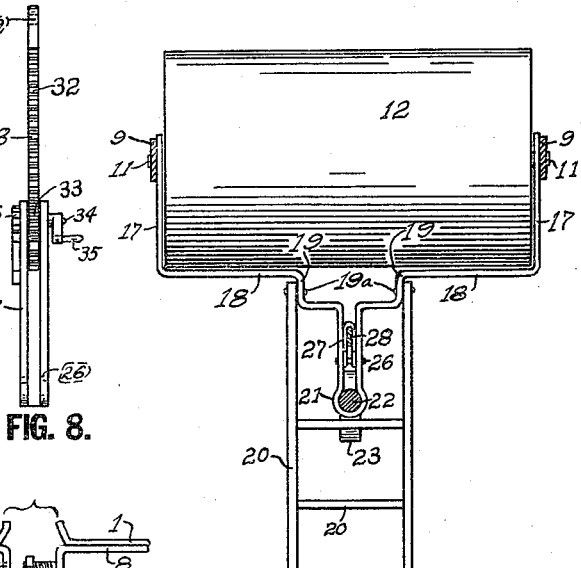
Figure 10:
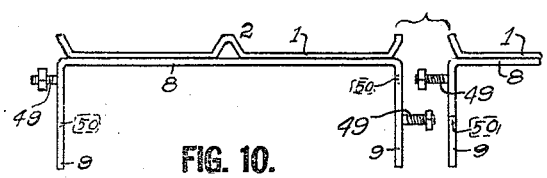
Figure 11:
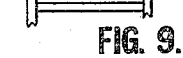
Figure 12:
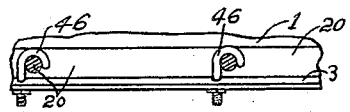
Figure 13:
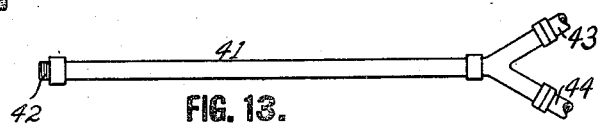
Figure 14:
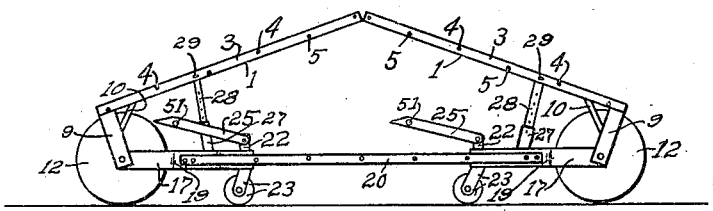
Figure 15:
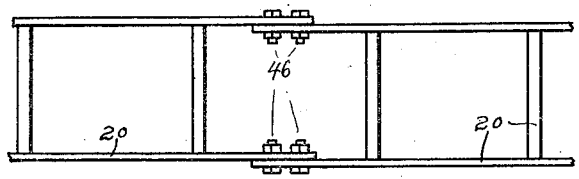
Figure 16:
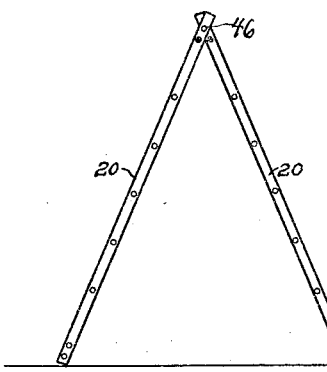
Figure 17:
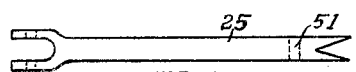
Figure 18:
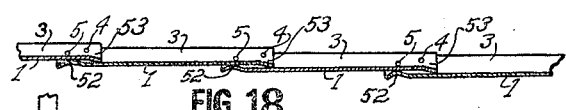
Figure 19:
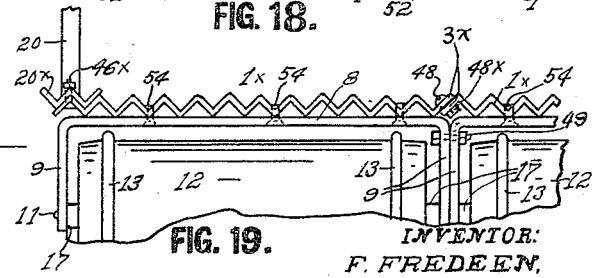

In the accompanying drawings:

Figure 1 is a side elevation of a pontoon bridge formed out of the main parts of the device. Fig. 2 is a plan view of Fig. 1. Fig. 3 is a side elevation of one of the sections of the bridge in the position it is used as a portable bullet shield for infantry. Fig. 4 is an elevation of Fig. 3 looking toward the left with the rifles omitted and a portion of a second section of the bridge shown as secured to one edge of the full section. It also shows how the device may move on a railway track. Fig. 5 is a detail end elevation of the drum-shaped wheel supporting each section of the bridge. Fig. 6 is a vertical longitudinal section of the drum in Fig. 5. Fig. 7 is a detail side view of a modification of the support 27—28 in Fig. 3. Fig. 8 is an edge view of Fig. 7. Fig. 9 is an enlarged section on the line 9—9 in Fig. 3 with the wheel 12 intact, and showing the ladder 20 in a horizontal position. Fig. 10 is an end view of two bridge sections about to be secured together edge to edge. Fig. 11 shows the sections in Fig. 10 secured together. Fig. 12 is a fragmentary top view of a portion of a bridge section showing how the ladders are secured to serve as railings upon the same. Fig. 13 represents a hose used for conveying oil or other liquid into and out of the drum-shaped wheels. Fig. 14 is a side elevation of two bridge sections secured together with their platforms in reversely inclined positions. Fig. 15 shows how ladders or bridge rail sections may be bolted together when a long ladder is required. Fig. 16 shows two ladders or sections of the bridge railing so bolted together that they form a step ladder. Fig. 17 is a detail top view of the bar 15 in Fig. 3. Fig. 18 is a section on the line 18—18 in Fig. 2. Fig. 19 is an end view of portions of two units joined together edgewise and showing some modifications.

Referring to the drawings by reference numerals, the device as a whole is composed of several units or similar sections which are securable together into a pontoon bridge as shown in Figs. 1 and 2 or may be otherwise used as will presently be described. Each section comprises a sheet metal platform 1 having a longitudinal upward ridge 2 and angular edge flanges 3 to stiffen it. Said flanges are each provided with an upper and a lower row of holes 4 and 5 respectively, and the body of the platform is provided with several rows of apertures 6 for pointing rifles 7 therethrough as shown in Figs. 4 and 3 when the platform is raised at an incline to serve as a bullet deflector.

Secured underneath the front end of each platform 1 is a frame consisting of a transverse bar 8 (see Figs. 10 and 11) having at each end a leg 9, steadied by a brace 10 (see Fig. 3). In said legs are journaled the ends of a shaft 11 of a drum-shaped wheel 12, which wheel is provided with peripheral ridges 13 and 14, of which those 13 serve as guiding flanges along the rails 15 of a railway when there is a railway track available for transportation of the device (see Fig. 4 in which 16 designates a railway tie).

Journaled upon the shaft 11 are also the arms 17 of a bail-shaped frame 18, the middle portion of which is formed with two shoulders 19 (see Fig. 9), to which may readily be detachably bolted at 19ᵃ one end of a ladder 20. The middle of the bail is extended rearwardly and formed into a journal bearing 21 for the stem 22 of a caster 23. To the top of said stem is detachably pivoted at 24 one end of a crowbar or steering pole 25 (best shown in Fig. 17).

Pivoted at 26 forward of the journal bearing 21 is the lower end of a supporting post made up of two telescoping sections 27 and 28. The top of said post is pivoted at 29 in the central longitudinal groove formed by the ridge 2 of the platform 1, which platform is thus supported by the post in an adjustable manner since the upper section of the post may be raised and lowered in the lower section 27 and secured in the desired position by a pin 30 in the lower section and a series of holes 31 for it in the upper section (see Fig. 3). In the modification in Figs. 7 and 8 is shown how said sections may be constructed with a rack 32 on the upper section and a cog-wheel 33 on a shaft 34 in the lower section; said shaft having a hand-crank 35 by which to turn it and a ratchet wheel 36 engaged by a dog 37, so that where the platform is of a heavy type it may be raised by such mechanism, while for a light type of the device the form of post shown in Fig. 3 will answer.

Each drum 12 has its ends reinforced by spiders 38, and one end of each drum is provided with a screw plug 39 screwed into a fixed threaded collar 40. This is to enable the wheels to serve as carriers for gasolene or other oils used for different purposes, or for carrying water in crossing deserts or dangerous territory where the enemy may have poisoned the springs and wells. In Fig. 13 is shown a hose 41, which may have its end 42 coupled to the collar 40 of the wheel and from its ends 43—44 deliver water or oil to several auto trucks or other engines at one time, when the wheel is turned with the collar 40 to a low point, as in Fig. 3. For filling of the wheel the same is turned with the collar 40 to a higher position, as in Fig. 5, and a hose or suitable funnel employed.

In Fig. 15 is shown how several of the ladders 20 may be secured together by bolts 45; and in Figs. 1 and 12 is partly shown how the ladders may be secured to the rims 3 of the platforms by hook-bolts 46 passed through the rims and engaging the rungs of the ladders.

In further describing the operation or use of the device, it will be seen in Figs. 1 and 2 that any required number of these units may be used for a pontoon bridge, the wheels 12 serving as floats and the platforms 1 being partly overlapped and secured together by bolts 47 in some of the upper holes 4 of the lower section and in the lower holes 5 of the upper section. Said holes being thus arranged in upper and lower rows, the sections are interchangeable so either one may be under or over the next one. And if a short but broad bridge is desired two or more rows of these units may be placed side by side across the water and preferably bolted together by inserting bolts through their adjacent rims 3 as indicated by the bolts 48 in Fig. 4. In the latter view it is also shown that when the platforms are thus bolted together for use either on water or land, the frames 8 also have their adjacent legs 9 secured together by bolts 49. This is also clearly shown in Figs. 10 and 11 where said bolts are preferably standing bolts secured one in each leg and each leg has a hole 50 for the standing bolt 9 of the adjoining leg to enter into; this is to make the units fit either side of each other. In such manner two or more units may be secured side by side in moving over smooth ground or they may be connected to move after each other, especially where tracks 15 are available, and if the ground is partly uneven or soft or where trenches are to be crossed the ladders 20 are used as track rails. A further service of the ladders is to use them as push-bars for the soldiers to take hold of in pushing or pulling and turning each unit separately, in which case the ladder is pivotally connected at 19ª as stated and shown in Figs. 3 and 4, where it is partly raised to avoid obstructing the view of the parts shown below it. Said lower parts indicate in dotted line how the bar 25 may be attached by a pin 51 in the front of the ridge 2 of the next unit when several units are hauled by any kind of power over the field while connected up in the shortest possible position and perhaps loaded with war supplies. During such transportation the caster wheel 23 may be raised off of the ground by shortening of the post 27—28, and if the platforms and not the bar 25 form the connection of the units the bar 25 may be turned forwardly as shown to the left in Fig. 14. Said bar also serves as a pushing and steering bar operated by the men when the ladder has been removed from the bail so as to serve either as track on the ground or as a step ladder, as shown in Fig. 16, or for getting in and out of deep trenches, or for scaling the walls of forts, or for building an observation tower out of a series of them by bolting them together and either holding the structure upright or arranging it in an A-shape, similar to that shown in Fig. 16. When the bar 25 is not in use for other purposes it may be detached and used as a crow-bar.

The fixed collars 14 on the drums, wheels or floats, are partly to stiffen the sheet metal and partly to act as guiding flanges along the ladders when the latter are used as track over soft or uneven ground.

During a retreat the bar 25 in Fig. 3 becomes a pole by which the unit is drawn rearwardly with the guns facing the enemy. If there be an attack from two opposite directions, two units are arranged the way shown in Fig. 14, so as to face in opposite directions, and may be so connected by one of the ladders 20. This arrangement of the units also makes a shelter for the soldiers against hail, snow, rain or dropping shells or fragments of bursting shells either over open field or over trenches, which may be covered by these units either in the position shown in Fig. 14 or that shown in Fig. 2. It is also understood that any two or more units may be secured together and used as a raft, and that the platforms may be more or less overlapped in longitudinal direction according to the weight they are to carry when secured together.

In the ordinary construction so far described, although the flanges 3 are inclined they will not allow the overlapping body of the upper platform to contact with the body of the lower platform. For said reason the lower platform is provided with transverse cleats 52 supporting the upper platform, and the latter has its end edge 53 formed into an inclined cleat bearing upon the lower platform. Preferably said cleats are formed in the plates by drawing dies, though they may also be made of wood or iron and secured to the platforms.

In the modification in Fig. 19 the plates or platforms 1ˣ, are stiffened by longitudinal corrugations all over their bodies, and are secured to the frames 8 by rivets 54. In said modification when the units are secured together edgewise their adjoining flanges 3ˣ fit face to face and are secured by bolts 48 having nuts 48ˣ; or 48 may be a machine screw threaded into the lower plate. In this modification each ladder 20 has its main bars 20ˣ (see Fig. 19) corrugated longitudinally, or formed with a V-shaped edge so as to fit upon the corrugated platform, to which they are secured by suitable bolts 46ˣ. The function of the adjustable post 27—28 is to support the platform 1 at any desired angle (see Fig. 3), especially when approaching an enemy.

It is obvious that several of the features described may be considerably changed or modified without diverging from the spirit and scope of this invention as defined by the claims.

What I claim is:—

1. A war appliance composed of several similar units adapted to be connected together and means for connecting them together, each unit comprising a platform with a frame fixed under the front end of it, a hollow wheel having journals rotatable in said frame, a bail-shaped frame having its legs journaled on said wheel journals and at its middle portion a rearwardly directed arm with a bearing on it, a caster having its stem journaled in said bearing, and an extensible post pivoted with its lower end to said rearward arm and its upper end to the platform.

2. The structure specified in claim 1 together with means for extending and for holding extended the post, whereby the platform may be inclined.

3. The structure specified in claim 2 together with a bar detachably pivoted with one end to the upper end of the stem of the caster and having its other end provided with means for attaching it to one end of an adjoining unit.

4. The structure specified in claim 1, said platform being formed with longitudinal corrugations to stiffen it.

5. The structure specified in claim 1, said platform being formed along its middle with an upward ridge to stiffen it and with upward flanges along its edges to stiffen it, said flanges having upper and lower rows of holes, bolts adapted for insertion in said holes for securing several platforms edgewise or endwise together as may be desired.

6. The structure specified in claim 1, said platform being formed along its middle with an upward ridge to stiffen it and with upward flanges along its edges to stiffen it, said flanges having rows of holes, bolts adapted for insertion in said holes for securing several platforms edgewise or endwise together as may be desired, and railings detachably secured along the edges of the platforms and so constructed that they may be used as ladders when detached from the platforms.

7. The structure described in claim 6 together with means for securing said ladders each with one end to the rear portion of one of the bail-shaped frames, and means for securing the ladders together lengthwise and also at various angles to each other when so required.

In testimony whereof I affix my signature.

FRANK FREDEEN.